US011218027B2

(12) United States Patent
Chang et al.

(10) Patent No.: US 11,218,027 B2
(45) Date of Patent: Jan. 4, 2022

(54) LIGHT-EMITTING WIRELESS CHARGING STRUCTURE AND DISPLAY APPARATUS APPLYING THE SAME

(71) Applicant: Qisda Corporation, Taoyuan (TW)

(72) Inventors: Yung-Yeh Chang, Taoyuan (TW); Ting-Hui Chih, Taoyuan (TW); Chen-Yang Hu, Taoyuan (TW); Jui-Chien Lu, Changhua County (TW); Hung-Wu Lin, Taichung (TW); Wen-Hung Li, Taoyuan (TW); Yu-Fu Fan, Hsinchu (TW); Che-Wei Shen, Hsinchu (TW); Tung-Hsien Tsai, Changhua County (TW); Yen-Chen Chiang, Taoyuan (TW)

(73) Assignee: Qisda Corporation, Taoyuan (TW)

(*) Notice: Subject to any disclaimer, the term of this patent is extended or adjusted under 35 U.S.C. 154(b) by 111 days.

(21) Appl. No.: 16/699,074

(22) Filed: Nov. 28, 2019

(65) Prior Publication Data

US 2020/0177030 A1 Jun. 4, 2020

(30) Foreign Application Priority Data

Nov. 29, 2018 (CN) .......................... 201811442697.2

(51) Int. Cl.
*H02J 50/30* (2016.01)
*H02J 50/00* (2016.01)

(52) U.S. Cl.
CPC ............ *H02J 50/30* (2016.02); *H02J 50/005* (2020.01)

(58) Field of Classification Search
None
See application file for complete search history.

(56) References Cited

U.S. PATENT DOCUMENTS

| 2010/0201315 | A1* | 8/2010 | Oshimi | H02J 50/10 320/108 |
| 2011/0004278 | A1* | 1/2011 | Aghassian | A61N 1/3787 607/61 |
| 2016/0087484 | A1* | 3/2016 | Kim | H02J 7/025 320/101 |
| 2018/0226827 | A1* | 8/2018 | Chen | H02J 7/027 |

FOREIGN PATENT DOCUMENTS

| CN | 203398821 U | * | 1/2014 |
| CN | 203398821 U | | 1/2014 |
| CN | 203628415 U | | 6/2014 |
| CN | 205283172 U | | 6/2016 |

* cited by examiner

*Primary Examiner* — Jared Fureman
*Assistant Examiner* — Joel Barnett

(57) ABSTRACT

A light-emitting wireless charging structure includes a base, a wireless charging module, a light-emitting element and an upper cover. The wireless charging module is disposed on the base. The light-emitting element is disposed on the base adjacent to the wireless charging module. The upper cover covers the wireless charging module and the light-emitting element. The upper cover has a lower surface facing the wireless charging module and an upper surface opposite to the bottom surface. When the light-emitting element emits light, light coming from the light-emitting element passes through the upper cover and forms a mark on the upper surface to indicate the position of the wireless charging module. When the light-emitting element is turn off or kept in an off state, either the mark that has been formed on the upper surface disappears therefrom or no any mark is ever shown on the top surface.

22 Claims, 6 Drawing Sheets

LIGHT-EMITTING WIRELESS CHARGING STRUCTURE AND DISPLAY APPARATUS APPLYING THE SAME

This application claims the benefit of People's Republic of China application Serial No. 201811442697.2, filed Nov. 29, 2018, the subject matter of which is incorporated herein by reference.

BACKGROUND OF THE INVENTION

Field of the Invention

The invention relates in general to a wireless charging structure, and more particularly to a light-emitting wireless charging structure applied by a portable electronic product for wireless charging and to a display apparatus applying the same.

Description of the Related Art

With the evolution of electronic products, various portable electronic products become necessary in daily life. In order to maintain the normal operation of these portable electronic products, each portable electronic product is equipped with a charger for recharging at all time. For purpose of conveniently recharging, currently, a wireless charging method has been applied to charge a portable electronic product. It is only necessary to place the portable electronic product on a predetermined position of a wireless charging device; the battery of the portable electronic product can be recharged by current magnetic effect and electromagnetic induction. The wireless charging device can be set up in a public space or built in other electronic products to help the user avoiding the inconvenience of carrying charging cable at all time.

However, a portable electronic product can be reliably charged by a conventional wireless chagrin device, only when the charge portable electronic product aligns accurately to a wireless charging transmitting coil module of the conventional wireless charging device. In order to improve the charging efficiency, a physical indication pattern is generally formed on the outer casing of the wireless charging device by a coated printing or surface etching to clearly indicate the position of the wireless charging transmitting coil module or the location on which the portable electronic product should be placed during the charging process. Alternatively, the position of the wireless charging transmitting coil module or the location on which the portable electronic product should be placed during the charging process can be indicated by an indication image displayed by a light-emitting device that includes a light-emitting element and a light guide plate both disposed between a light-transmitting outer casing and the wireless charging transmitting coil module of the wireless charging device.

But there are still drawbacks to the physical indication pattern and the indication image. For example, the physical indication pattern may limit the design of the wireless charging device and there is a risk of detachment or wear. The charging efficiency may be adversely affected by arrangement of the light-emitting device for displaying the indication image, due to the fact that the light-emitting element and the light guide plate may increase the electromagnetic induction distance between the wireless charging transmitting coil module and the portable electronic product. Therefore, there is a need to provide an advanced light-emitting wireless charging structure and applications thereof to obviate the problems encountered from the prior art.

There is a need to provide an advanced light-emitting wireless charging structure and a display apparatus applying the same to overcome the drawbacks of the prior art.

SUMMARY OF THE INVENTION

A light-emitting wireless charging structure and display apparatus applying the same that can indicate a charging position and have better charging efficiency to solve the above problems encountered from the prior art are provided.

One aspect of the present disclosure is to provide a light-emitting wireless charging structure, the light-emitting wireless charging structure includes a base, a wireless charging module, at least one light-emitting element and an upper cover. The wireless charging module is disposed on the base. The at least one light-emitting element is disposed on the base and adjacent to an outer edge of the wireless charging module. The upper cover covers on the wireless charging module and the at least one light-emitting element, wherein the upper cover has a lower surface facing the wireless charging module and an upper surface opposite to the lower surface. When the at least one light-emitting element is turn on, light coming from the at least one light-emitting element passes through the upper cover and forms a mark on the upper surface to indicate the position of the wireless charging module. When the at least one light-emitting element is turn off or kept in an off state, either the mark that has been formed on the upper surface disappears therefrom, or no any mark is ever shown on the top surface. Since the lower surface of the upper cover directly faces the wireless charging module to reduce the distance therebetween, thus the charging efficiency of the light-emitting wireless charging structure can be improved.

In comparison with the prior art, a light-emitting wireless charging structure and a display apparatus applying the same are provided to indicated the position of the wireless charging module. A light-transmitting upper cover is applied to cover the wireless charging module, and the portable electronic product intended to be charged can be disposed on the upper surface of the upper cover that is opposite to a lower surface facing the wireless charging module. By radically arranging at least one light-emitting element along the radial edge of the wireless charging module, a mark can be formed on the upper surface to accurately indicate the position of the wireless charging module, when the light-emitting element is turn on; and when the light-emitting element is turn off, the formed mark disappears therefrom. Since the lower surface of the upper cover directly faces the top surface of the wireless charging module and the light guide plate required by the prior art can be omitted, thus the electromagnetic induction distance between the portable electronic product and the wireless charging module can be shortened, and the charging efficiency of the portable electronic product can be improved.

DETAILED DESCRIPTION OF THE INVENTION

The present disclosure provides a light-emitting wireless charging structure and a display apparatus applying the same to improve its charging efficiency and make the design of the light-emitting wireless charging structure more flexible. The above and other aspects of the disclosure will become better understood by the following detailed description of the preferred but non-limiting embodiment(s). The following description is made with reference to the accompanying drawings:

Several embodiments of the present disclosure are disclosed below with reference to accompanying drawings. However, the structure and content disclosed in the embodiments are for exemplary and explanatory purposes only, and the scope of protection of the present disclosure is not limited to the embodiments. It should be noted that the present disclosure does not illustrate all possible embodiments, and anyone skilled in the technology field of the invention will be able to make suitable modifications or changes based on the specification disclosed below to meet actual needs without breaching the spirit of the invention. The present disclosure is applicable to other implementations not disclosed in the specification.

Figure 1A:
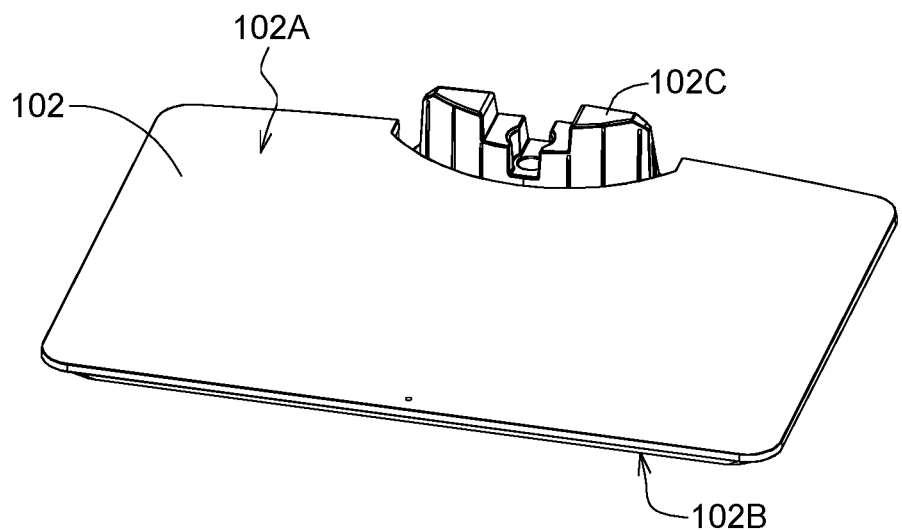
FIG. 1A is a perspective view illustrating a light-emitting wireless charging structure according to one embodiment of the present disclosure.
Figure 1A:
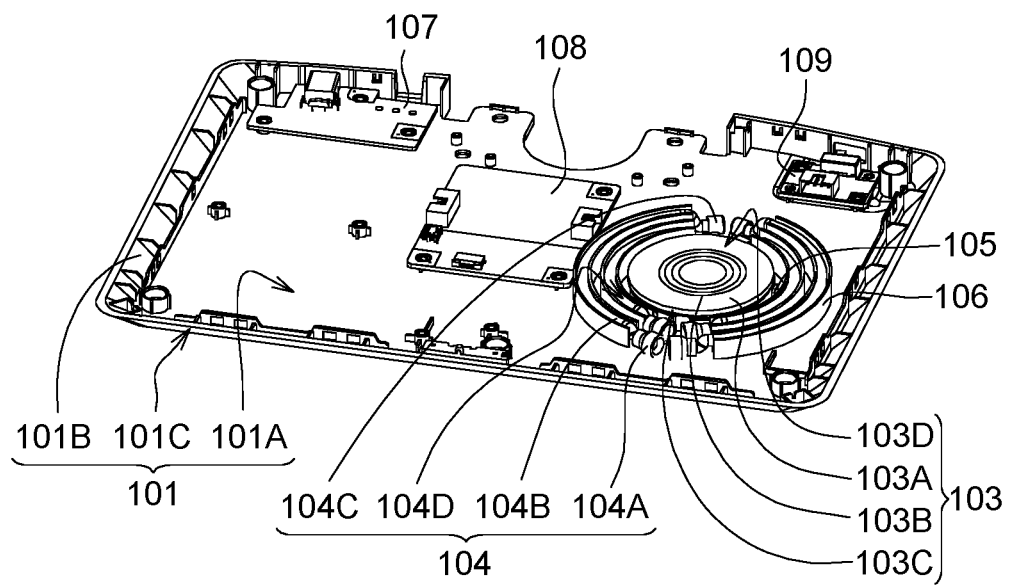
Figure 1B:
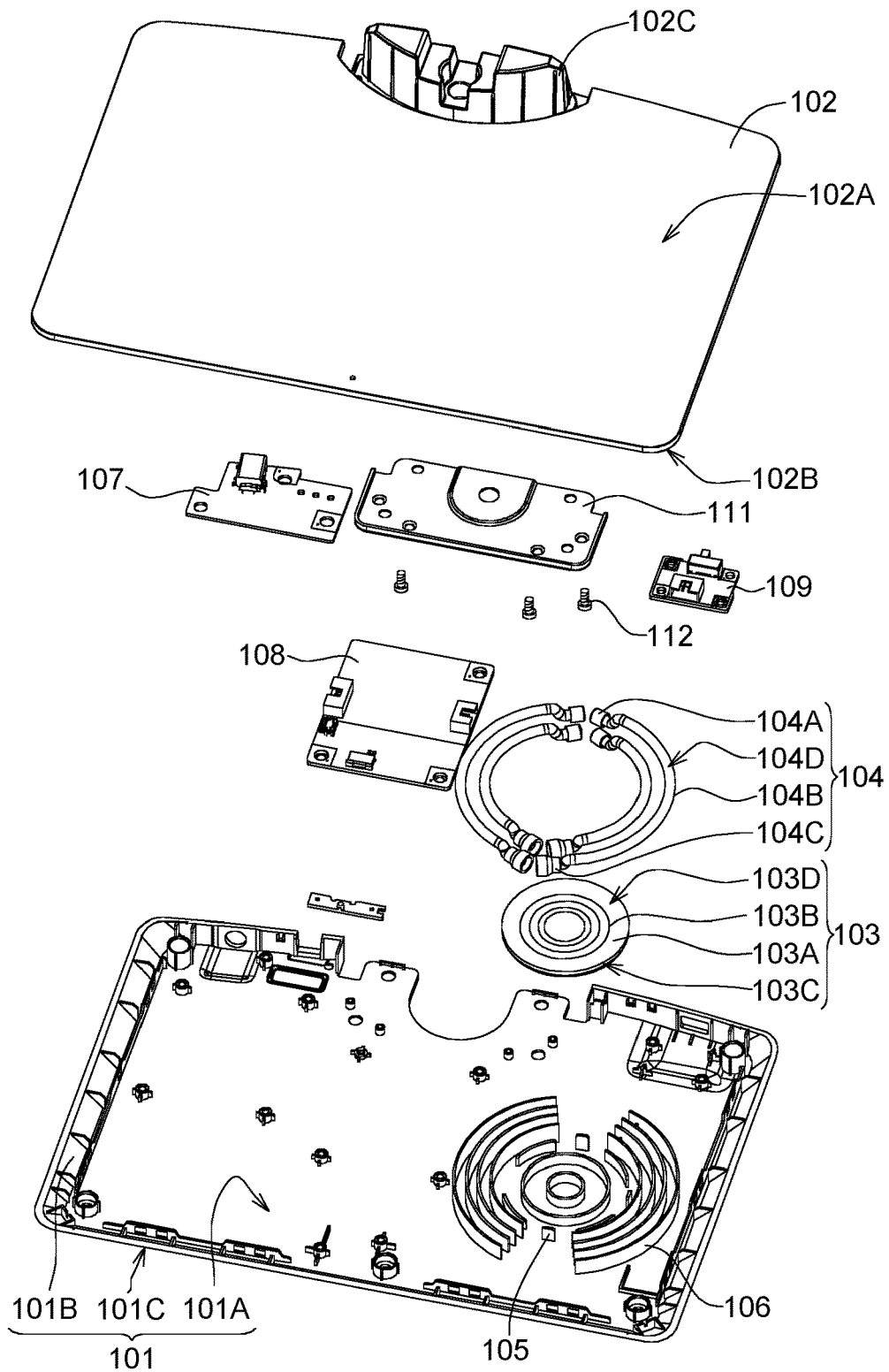
FIG. 1B is an explosion view illustrating the components of the light-emitting wireless charging structure as depicted in FIG. 1A.

FIG. 1A is a perspective view illustrating a light-emitting wireless charging structure 100 according to one embodiment of the present disclosure. FIG. 1B is an explosion view illustrating the components of the light-emitting wireless charging structure 100 as depicted in FIG. 1A. The light-emitting wireless charging structure 100 includes a base 101, an upper cover 102, a wireless charging module 103 and at least one light-emitting element 104. The wireless charging module 103 is disposed on the base 101. The at least one light-emitting element 104 is disposed on the base 101 and adjacent to an outer edge of the wireless charging module 103. The upper cover 102 covers on the wireless charging module 103 and the at least one light-emitting element 104, wherein the upper cover 102 has an upper surface 102A and a lower surface 102B; the lower surface 102B faces the wireless charging module 103; and the upper surface 102A is opposite to the lower surface 102B. When the at least one light-emitting element 104 is turn on, light coming from the at least one light-emitting element 104 passes through the upper cover 102 and forms a mark T on the upper surface 102A to indicate the position of the wireless charging module 103. When the at least one light-emitting element 104 is turn off, the mark T that has been formed the upper surface 102A disappears therefrom. When the at least one light-emitting element 104 is kept in an off state from the beginning, no any mark T is ever formed on the upper surface 102A.

In some embodiments of the present disclosure, the base 101 may be a housing used to carry/support the wireless charging module 103 and the at least one light-emitting element 104, and can be assembled with the upper cover 102 to form an accommodating space for accommodating the wireless charging module 103 and the at least one light-emitting element 104.

For example, in the present embodiment, the base 101 can be a rigid housing made of metal or plasticized material having a bottom surface 101A, a plurality of side walls 101B, and an opening 101C defined by these side walls 101B. The wireless charging module 103 and the at least one light-emitting element 104 are respectively disposed on the bottom surface 101A. The upper cover 102 is disposed corresponding to the opening 101C and covers the wireless charging module 103 and the light-emitting element 104. The wireless charging module 103 and the at least one light-emitting element 104 are disposed in the accommodating space defined by the upper cover 102, the bottom surface 101A and the side walls 101B of the base 101.

The wireless charging module 103 includes a magnetic conductive plate 103A and a transmitting coil 103B, wherein the transmitting coil 103B is disposed on the magnetic conductive plate 103A. In some embodiments of the present disclosure, the wireless charging module 103 is fixed on the bottom surface 101A of the base 101 by a fixing member 105 disposed on the bottom surface 101A of the base 101. In the present embodiment, the wireless charging module 103 has a circular edge 103C. The fixing member 105 for fixing the wireless charging module 103 may be a plurality of arc-shaped ribs protruding from the bottom surface 101A of the base 101 and parallel adjacent to the circular outer edge 103C of the wireless charging module 103. Wherein, the area surrounded by the arcuate rib is the same as the area of the circular outer edge 103C of the wireless charging module 103 projected on the bottom surface 101A of the base 101. Such that, the fixing member 105 can fix the wireless charging module 103 at a specific position of the bottom surface 101A of the base 101 by tight fitting.

The at least one light-emitting element 104 is also disposed on the bottom surface 101A of the base 101 and radially adjacent to the outer edge 103C of the wireless charging module 103. The at least one light-emitting element 104 may include a point-light source 104A, a light guide strip 104B, and a light-blocking member 104C, wherein the point-light source 104A is disposed at one end of the light guide strip 104B; and the light-blocking member 104C is disposed at the other end of the light guide strip 104B. In the present embodiment, the at least one light-emitting element 104 may be composed of a plurality of strip-shaped light-emitting sub-elements, wherein each of the strip-shaped light-emitting sub-elements includes a point-light source 104A, a light guide strip 104B, and a light-blocking member 104C. The point-light source 104A is disposed at one end of the light guide strip 104B; the light-blocking member 104C is disposed at the other end of the light guide strip 104B.

In some embodiments of the present disclosure, the light guide strip 104B may be a flexible strip made of a light-transmitting material. The light-transmitting material used for constituting the light guide strip 104B may be, for example, acrylic, rubber, poly-methyl methacrylate (PMMA) resin or the arbitrary combinations thereof. The light guide strips 104B are disposed substantially parallel to (i.e. radially arranged and adjacent to) the outer edge 103C of the wireless charging module 103. That is, the light guide strip 104B is disposed adjacent to the outer edge 103C of the wireless charging module 103 and is kept substantially parallel with the outer edge 103C. In some embodiments of the present disclosure, the light guide strip 104B may have an annular structure continuously surrounding the outer edge 103C of the wireless charging module 103. In some other embodiments, the light guided strip 104B may include a plurality of curved strips disposed adjacent to the outer edge 103C of the wireless charging module 103 and discontinuously surrounding the outer edge 103C of the wireless charging module 103.

The point-light source 104A can be a light-emitting diode (LED) that emits white light or other colored light. The light-blocking member 104C may be a light-shielding film or a light-shielding sleeve that is sleeved on the other end of the light guide strip 104B with respect to the point-light source 104A. The light coming from the point-light source 104A is directed by the light guide strip 104B to be uniformly dispersed therein and uniformly emit outwards through the microstructure light-emitting pattern (not shown) formed on the surface of the light guiding strip 104B. In one embodiment of the present disclosure, the at least one light-emitting element 104 includes a plurality of arcuate light guide strips 104B having several different radii and radially arranged outside the outer edge 103C of the wireless charging module 103, wherein at least one of the plural arcuate light guide strips 104B surrounds the wireless charging module 103. In the present embodiment, the at least one light-emitting element 104 includes four arcuate light guide strips 104B, by which two coaxial annular structures are formed on the outer side of the outer edge 103C of the wireless charging module 103, thereby discontinuously surround the edge 103C of the wireless charging module 103. For example, two of the four arcuate light guide strips 104B are discontinuously encircled to form a first annular structure, and the other two arcuate light guide strips 104B are discontinuously arranged to form a second annular structure having a larger diameter than that of the first annular structure, wherein the first annular structure is coaxial with the second annular structure. In an alternative embodiment, one of the four arcuate light guide strips 104B may be discontinuously encircled to form a first annular structure, and the other three arcuate light guide strips 104B are discontinuously encircled to form a second annular structure, wherein the first annular structure is coaxial with the second annular structure; and the first annular structure has a diameter different from that of the second annular structure. However, the arrangements of the arcuate light guide strips 104B is not limited to these regards. It can be determined by the designer according to the actual situation, and will not be described here. When the at least one light-emitting element 104 is turn on to emit light, the profile of the outer edge 103C of the wireless charging module 103 can be highlighted. It should be noted that the arrangements and quantity of the light guide strips 104B are also not limited thereto.

In some embodiments of the present disclosure, the light guide strips 104B are fixed on the bottom surface 101A of the base 101 by at least one fixing member 106 disposed on the bottom surface 101A of the base 101. In the present embodiment, the at least one fixing member 106 includes a plurality of ribs parallel to the fixing member 105, wherein the distance between adjacent two ribs of the fixing member 106 is substantially equal to the width of the light guide strips 104B. Therefore, the at least one fixing member 106 can fix the light guide strips 104B of the at least one light-emitting element 104 outside the outer edge 103C of the wireless charging module 103 by tight fitting.

In some embodiments of the present disclosure, the light-emitting wireless charging structure 100 may further include at least one circuit board, such as a printed circuit board (PCB), disposed on the bottom surface 101A of the base 101, and the at least one circuit board is electrically connected to the wireless charging module 103 or the at least one light-emitting element 104. For example, in the present embodiment, the light-emitting wireless charging structure 100 includes a PCB 107 having a direct current (DC) power transmission circuit 107 for connecting to a power source (not shown), a PCB 108 having a circuit for driving the at least one light-emitting element 104, and a PCB 109 having a circuit for driving the Wi-Fi transceiver of the wireless charging module. These PCBs 107, 108 and 109 are disposed on the bottom surface 101A of the base 101, and are disposed in the accommodating space defined by the upper cover 102, the bottom surface 101A of the base 101 and the side walls 101B, and can be directly or indirectly coupled to the wireless charging module 103 and the at least one light-emitting element 104 through wires (not shown). Besides, these PCBs 107, 108 and 109 do not overlap with at least one of the wireless charging module 103 and the at least one light-emitting element 104. In the present embodiment, both of the wireless charging module 103 and the at least one light-emitting element 104 are not overlapping with these PCBs 107, 108 and 109.

In the embodiment of the present disclosure, the upper cover 102 may be a light-transmitting flat plate or a light-transmitting housing, that has an upper surface 102A and a lower surface 102B opposite to the upper surface 102A. The upper surface 102A of the upper cover 102 can be used to carry/support a portable electronic product (not shown) to be charged. The lower surface 102A of the upper cover 102 may directly face the wireless charging module 103 and the at least one light-emitting element 104. For example, in some embodiments of the present disclosure, the upper cover 102 may be a flat plate or housing made of glass or light-transmitting plastic materials. The upper cover 102 is engaged with the base 101 by an assembling member 111 and a plurality of latch members (e.g., screws) 112.

When the at least one light-emitting element 104 is turn on to emit light, the light provided by the at least one light-emitting element 104 can transmit passing through the upper cover 102, and an indication mark T can be formed on the upper surface 102A to indicate the position under which the wireless charging module 103 is located, so that the user can place the portable electronic product (e.g. a mobile phone) 114 in an appropriate charging position. When the at least one light-emitting element 104 is turn off, the indication mark T that has been formed on the upper surface 102A disappears therefrom. When the at least one light-emitting element 104 is kept in an off state from the beginning, no any indication mark T is ever formed on the upper surface 102A. In some embodiments of the present disclosure, the lower surface 102B of the upper cover 102 has a transmittance substantially greater than that of the upper surface 102A, so that external light does not easily penetrate trough the light-transmitting upper cover 102 from the upper surface 102A. For example, the upper cover 102 can be made of a one-way light transmissive plate. When the at least one light-emitting element 104 does not emit light, the profile of the wireless charging module 103 and/or the at least one light-emitting element 104 cannot be seen from the upper surface 102A of the upper cover 102. Such that, it may be more flexible for designing the physical appearance of the light-emitting wireless charging structure 100.

In other embodiments, the upper cover 102 can be alternatively made of a black or dark colored light transmissive material, such as blackened glass. When the at least one light-emitting element 104 does not emit light, neither the indication mark T nor the profile of the internal structure can be seen from the upper surface 102A of the upper cover 102. When the at least one light-emitting element 104 emits light, merely the indication mark T can be shown on the position of the upper surface 102A corresponding to the wireless charging module 103, and the other portions of the upper surface 102A are still in a dark state, the profiles of the wireless charging module 103 and/or the at least one light-emitting element 104 cannot be seen from the other portions of the upper surface 102A of the upper cover 102. In addition, but not limited to this regard, when a portable electronic product is disposed on the upper surface 102A of the upper cover 102 for charging, one of the at least one light-emitting element 104 can be turn on to indicate the operating state of the light-emitting wireless charging structure 100.

Figure 2:
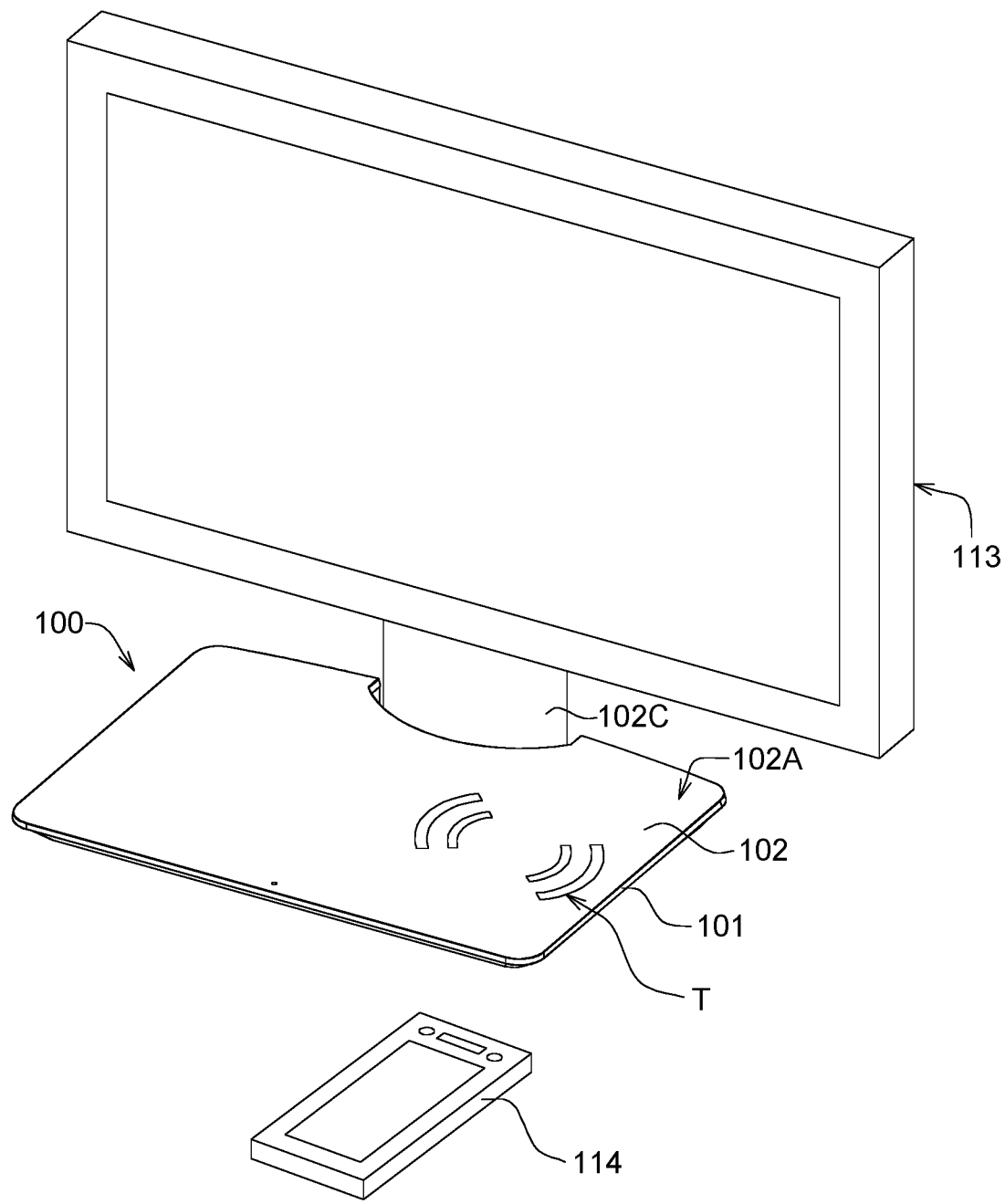
FIG. 2 is a perspective view illustrating a display apparatus applying a light-emitting wireless charging structure according to one embodiment of the present disclosure.

In some embodiments of the present disclosure, the upper cover 102 may also include a connector 102C for use in conjunction with other devices. For example, FIG. 2 is a perspective view illustrating a display apparatus 20 applying the light-emitting wireless charging structure 100 according to one embodiment of the present disclosure. In the present embodiment, the connector 102C of the upper cover 102 of the light-emitting wireless charging structure 100 is assembled with an external display screen 113 (e.g. a liquid crystal display (LCD)) to constitute the display apparatus 20. In addition to the wireless charging function, the light-emitting wireless charging structure 100 can also be used as the base of the display apparatus 20, that is, the light-emitting wireless charging structure 100 can support the display screen 113.

Figure 3:
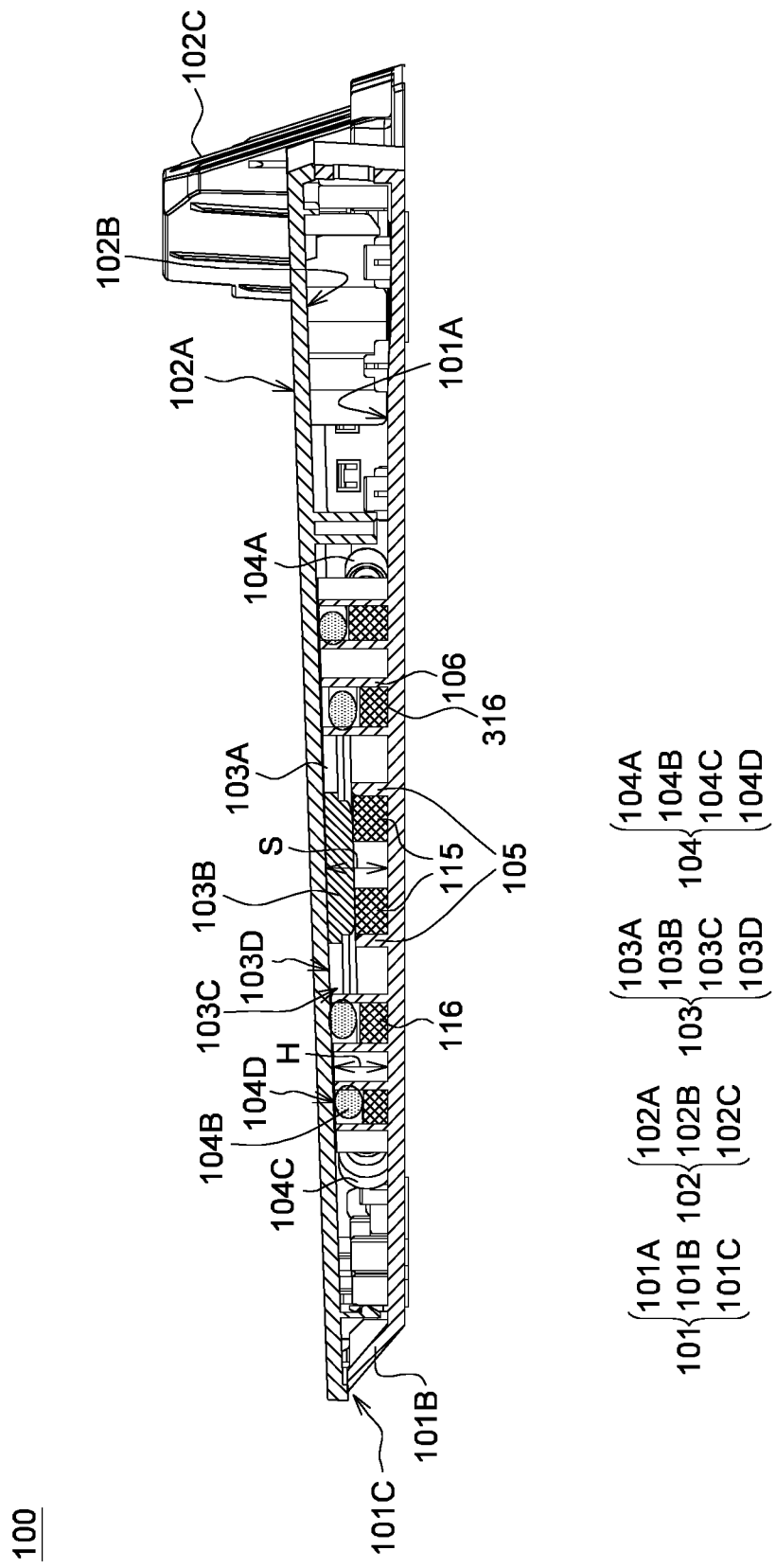
FIG. 3 is a partial cross-sectional view illustrating a light-emitting wireless charging structure according to one embodiment of the present disclosure.

FIG. 3 is a partial cross-sectional view illustrating a light-emitting wireless charging structure 100 according to one embodiment of the present disclosure. The at least one light-emitting element 104 has a surface 104D that is coplanar with the top surface 103D of the wireless charging module 103, and the lower surface 102B of the upper cover 102 is directly adjacent to the surface 104D of the at least one light-emitting element 104 and the top surface 103D of the wireless charging module 103. A top surface height H measured from the bottom surface 101A of the base 101 to the top surface 103D of the wireless charging module 103 is equal to the distance S from the bottom surface 101A of the base 101 to the lower surface 102B of the upper cover 102. In other words, in the present embodiment, there is no space between the lower surface 102B of the upper cover 102 and the surface 104D of the at least one light-emitting element 104 and the top surface 103D of the wireless charging module 103 to accommodate other optical components. Since there is no other component between the wireless charging module 103 and the upper cover 102, thus the charging efficiency can be improved. At the same time, the at least one light-emitting element 104 directly contacting to the lower surface 102B of the upper cover 102 can form an indication mark T on the predetermined position of the upper surface 102A more accurately.

However, it can be understood that the direct contact of the at least one light-emitting element 104 with the upper cover 102 is not a necessary restriction/limitation. In some other embodiments of the present disclosure, the at least one light-emitting element 104 does not directly contact to the lower surface 102B of the upper cover 102. There exists a distance between the at least one light-emitting element 104 and the lower surface 102B of the upper cover 102, but the aforementioned functions still can be achieved.

In order to make the surface 104D of the at least one light-emitting element 104 coplanar with the top surface 103D of the wireless charging module 103, at least one second supporting member 115 disposed on the bottom surface 101A of the base 101 may be applied to support and elevate the wireless charging module 103; meanwhile at least one first supporting member 116 disposed on the bottom surface 101A and adjacent to the fixing member 106 can be applied to support and elevate the at least one light-emitting element 104. Thereby, the wireless charging module 103 and the at least one light-emitting element 104 can be raised, so as to make the surface 104D of the at least one light-emitting element 104 and the top surface 103D of the wireless charging module 103 both have a height measured from the bottom surface 101A equal to the aforementioned top surface height H. In the present embodiment, the height of the fixing member 106 is greater than the height of the first supporting member 116.

Figure 4:
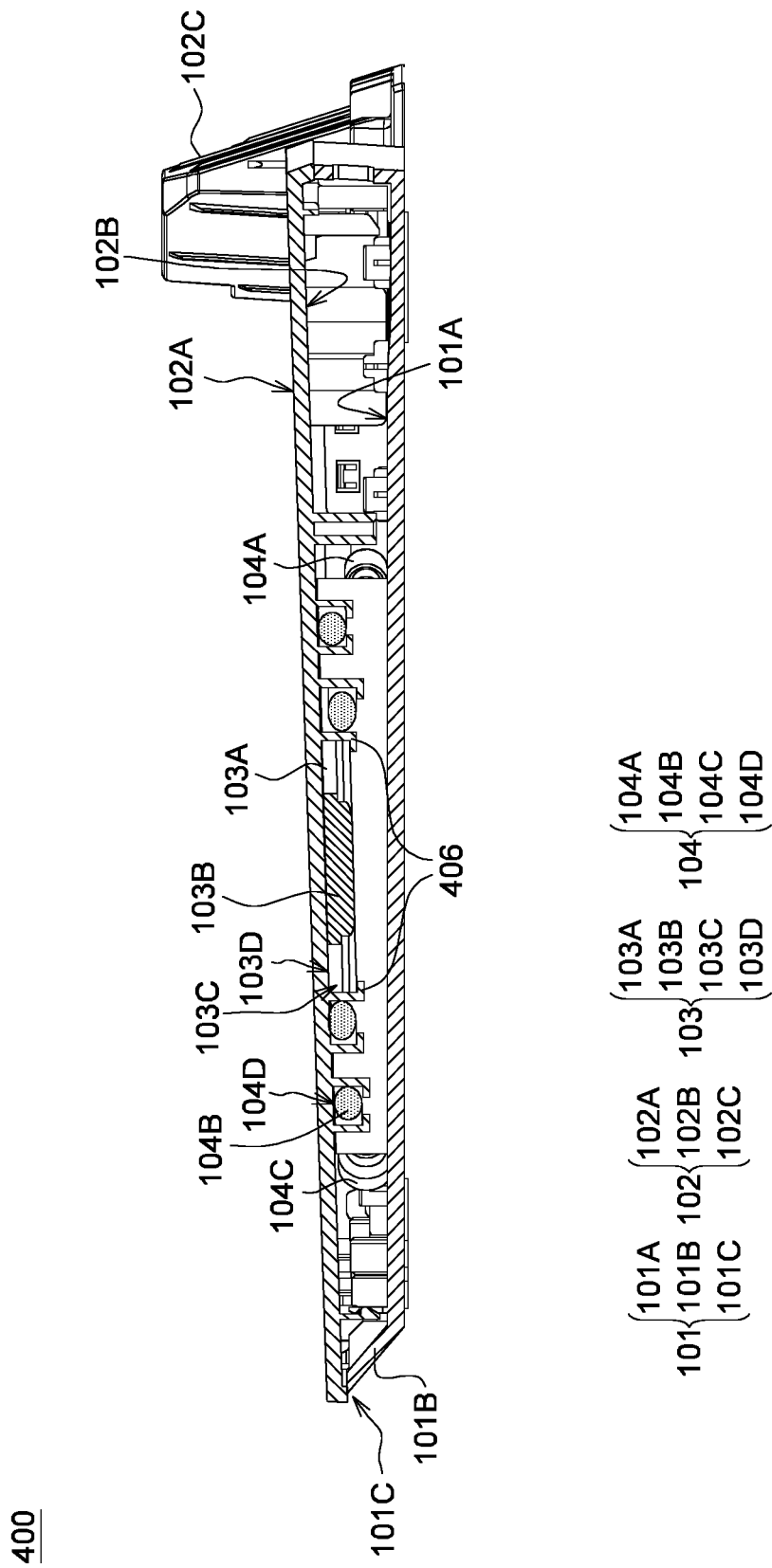
FIG. 4 is a partial cross-sectional view illustrating a light-emitting wireless charging structure according to another embodiment of the present disclosure.

FIG. 4 is a partial cross-sectional view illustrating a light-emitting wireless charging structure 400 according to another embodiment of the present disclosure. The structure of the light-emitting wireless charging structure 400 is similar to that of the light-emitting wireless charging structure 100 as depicted in FIG. 3, except that the at least one light-emitting element 104 and the wireless charging module 103 of the light-emitting wireless charging structure 400 are directly fixed on the lower surface 102B of the upper cover 102. In the present embodiment, the at least one light-emitting element 104 and the wireless charging module 103 are directly fixed onto the lower surface 102B of the upper cover 102 by at least one fixing member 406 protruding from the lower surface 102B of the upper cover 102, to make the surface 104D of the at least one light-emitting element 104 and the top surface 103D of the wireless charging module 103 coplanar and directly facing to the lower surface 102B of the upper cover 102.

Figure 5:
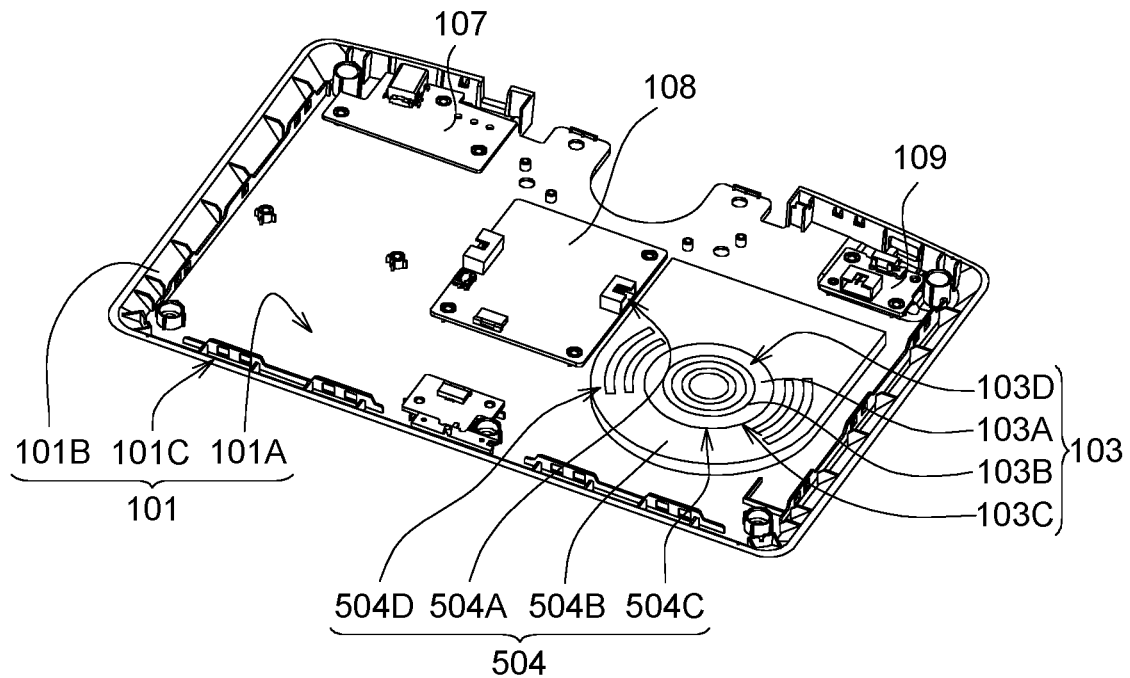
FIG. 5 is a partial prospective view illustrating a light-emitting wireless charging structure according to another embodiment of the present disclosure.

FIG. 5 is a partial prospective view illustrating a light-emitting wireless charging structure 500 according to yet another embodiment of the present disclosure. The structure of the light-emitting wireless charging structure 500 is similar to that of the light-emitting wireless charging structure 100 as depicted in FIG. 1A, except that the at least one light-emitting element 504 used in the light-emitting wireless charging structure 500 is an edge-lit backlight module.

In the present embodiment, the at least one light-emitting element 504 includes an edge-lighting source 504A (for example, may be a light emitting diode assembly) and a light guide plate 504B. The light guide plate 504B has an opening 504C and a light-exiting pattern 504D. The edge of the opening 504C is radially adjacent to the outer edge 103C of the wireless charging module 103 and surrounds the wireless charging module 103. The edge-lighting source 504A is disposed on one side of the light guide plate 504B and does not overlap with the light guide plate 504B. When the edge-lighting source 504A is turn on to emit light, the light comes from the edge-lighting source 504A can pass through the light-exiting pattern 504D and the upper cover 102 to form an indication mark T (not shown) on the upper surface 102A of the upper cover 102.

Figure 6:
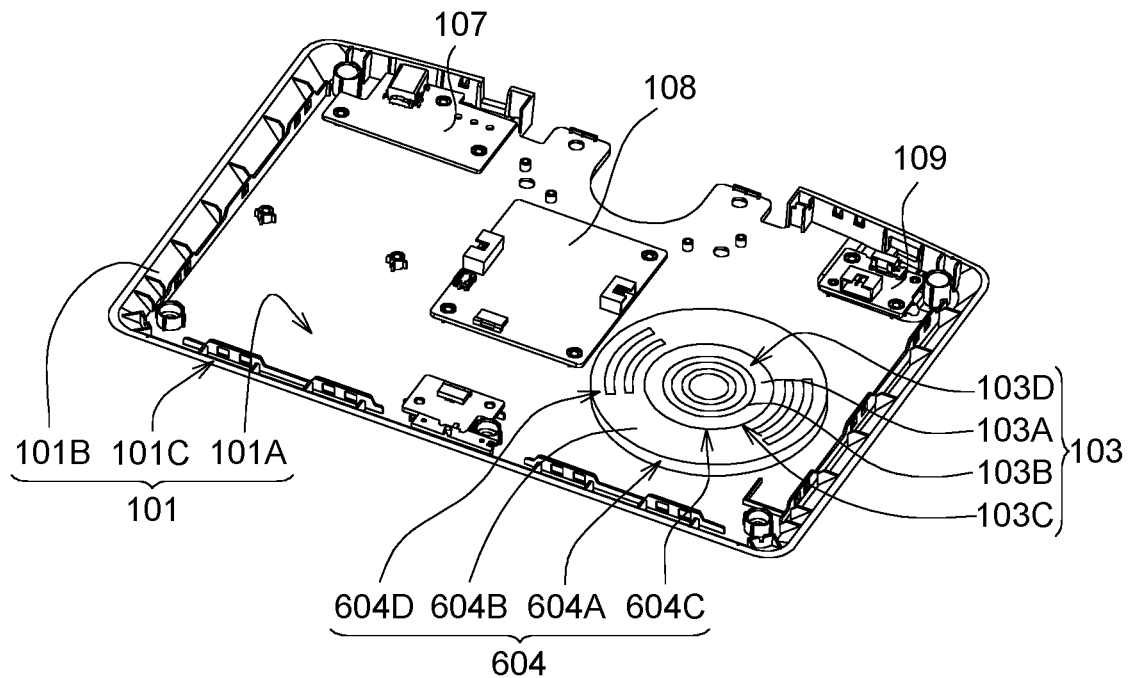
FIG. 6 is a partial prospective view illustrating a light-emitting wireless charging structure according to yet another embodiment of the present disclosure.

FIG. 6 is a partial prospective view illustrating a light-emitting wireless charging structure 600 according to yet another embodiment of the present disclosure. The structure of the light-emitting wireless charging structure 600 is similar to that of the light-emitting wireless charging structure 500 as depicted in FIG. 5, except that the at least one light-emitting element 604 used in the light-emitting wireless charging structure 600 is a direct-lighting backlight module.

In the present embodiment, the at least one light-emitting element 604 includes a backlight source 604A (for example, may be a light emitting diode assembly) and a light guide plate 604B. The light guide plate 604B has an opening 604C and a light-exiting pattern 604D. The edge of the opening 604C is radially adjacent to the outer edge 103C of the wireless charging module 103 and surrounds the wireless charging module 103. The backlight source 604A is disposed between the bottom surface 101A of the base 101 and the light guide plate 604B (i.e. overlaps with the light guide plate 604B). When the backlight source 604A is turn on to emit light, the light coming from the backlight source 604A can pass through the light-exiting pattern 604D and the upper cover 102 to form an indication mark T (not shown) on the upper surface 102A of the upper cover 102.

In sum, the embodiments of the present disclosure provide a light-emitting wireless charging structure and a display apparatus applying the same for indicating the position of a wireless charging module. A light-transmitting upper cover is used cover to cover the wireless charging module, and the upper surface of the upper cover is used to carry/support a portable electronic product to be charged. At least one light-emitting element is radially arranged on the outer edge of the wireless charging module. When the at least one light-emitting element emits light, an indication mark can be formed on the upper surface of the upper cover to accurately indicate the position corresponding to the wireless charging module. When the at least one light-emitting element does not emit light, either the indication mark that has been formed on the upper surface disappears therefrom, or no any indication mark is ever shown on the top surface. In addition, since the lower surface of the upper cover directly faces the top surface of the wireless charging module, thus the prior art patterned light guide plate can be omitted, and the electromagnetic induction distance between the wireless charging transmitting coil module and the portable electronic product to be charged can be shortened. The charging efficiency of the portable electronic products can be significantly improved.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light-emitting wireless charging structure, comprising:
   a base;
   a wireless charging module, disposed on the base;
   at least one light-emitting element, disposed on the base and adjacent to the wireless charging module; and
   an upper cover, covering on the wireless charging module and the at least one light-emitting element, wherein the upper cover has a lower surface facing the wireless charging module and a upper surface opposite to the lower surface;
   wherein the at least one light-emitting element has a surface coplanar with a top surface of the wireless charging module; the lower surface is adjacent to the surface and the top surface; and a top surface height measured from a bottom surface of the base to the top surface is equal to a distance from the bottom surface to the lower surface;
   when the at least one light-emitting element emitting light, the light coming from the at least one light-emitting element passes through the upper cover and forms a mark on the upper surface to indicate a position of the wireless charging module; when the at least one light-emitting element is turn off or kept in an off state, either the mark that has been formed on the upper surface disappears therefrom, or no any mark is ever shown on the top surface.

2. The light-emitting wireless charging structure according to claim 1, further comprising at least one first fixing member disposed on the bottom surface of the base for fixing the at least one light-emitting element.

3. The light-emitting wireless charging structure according to claim 2, further comprising:
   a first supporting member, disposed adjacent to the at least one fixing member to support and elevate the at least one light-emitting element, wherein a height of the at least one fixing member is greater than that of the first supporting member; and
   a second supporting member, disposed on the bottom surface to support and elevate the wireless charging module to make the top surface having a height measured from the bottom surface equal to the top surface height.

4. The light-emitting wireless charging structure according to claim 1, wherein the at least one light-emitting element comprises a plurality of arcuate light guide strips having different radii and radially arranged outside an outer edge of the wireless charging module; and at least one of the plural arcuate light guide strips surrounds the wireless charging module.

5. The light-emitting wireless charging structure according to claim 1, wherein the lower surface of the upper cover has a transmittance substantially greater than that of the upper surface.

6. The light-emitting wireless charging structure according to claim 5, wherein the upper cover is made of a one-way light transmissive plate.

7. The light-emitting wireless charging structure according to claim 1, wherein the at least one light-emitting element comprises:
   a light guide strip;
   a point-light source, disposed at one end of the light guide strip; and
   a light-blocking member, disposed at the other end of the light guide strip.

8. The light-emitting wireless charging structure according to claim 1, further comprising at least one circuit board disposed on the bottom surface of the base, and electrically connected to the wireless charging module or the at least one light-emitting element, wherein the at least one circuit board does not overlap with at least one of the wireless charging module and the at least one light-emitting element.

9. The light-emitting wireless charging structure according to claim 1, further comprising at least one second fixing member disposed on the lower surface of the upper cover for fixing the at least one light-emitting element onto the lower surface.

10. The light-emitting wireless charging structure according to claim 1, wherein the upper cover is made of a black or dark colored light transmissive material; when the at least one light-emitting element is turn on, the light coming from the at least one light-emitting element passes through the black or dark colored light transmissive material to form the indication mark on the upper surface; when the at least one light-emitting element does not emit light, neither the indication mark, nor a profile of the wireless charging module and the at least one light-emitting element can be seen from the upper surface.

11. A display apparatus, comprising:
a display screen; and
a light-emitting wireless charging structure, comprising:
a base;
a wireless charging module, disposed on the base;
at least one light-emitting element, disposed on the base and adjacent to the wireless charging module; and
an upper cover, covering on the wireless charging module and the at least one light-emitting element, wherein the upper cover has a lower surface facing the wireless charging module and an upper surface opposite to the lower surface;
wherein the at least one light-emitting element has a surface coplanar with a top surface of the wireless charging module; the lower surface is adjacent to the surface and the top surface; and a top surface height measured from a bottom surface of the base to the top surface is equal to a distance from the bottom surface to the lower surface;
when the at least one light-emitting element emitting light, the light coming from the at least one light-emitting element passes through the upper cover and forms a mark on the upper surface to indicate a position of the wireless charging module; when the at least one light-emitting element is turn off or kept in an off state, either the mark that has been formed on the upper surface disappears therefrom, or no mark is ever shown on the top surface.

12. The display apparatus according to claim 11, wherein the at least one light-emitting element has a surface coplanar with a top surface of the wireless charging module; the lower surface is adjacent to the surface and the top surface; and a top surface height measured from a bottom surface of the base to the top surface is equal to a distance from the bottom surface to the lower surface; wherein the upper cover of the light-emitting wireless charging structure has a connector assembled with the display screen to make the light-emitting wireless charging structure supports the display screen.

13. The display apparatus according to claim 12, further comprising:
at least one first fixing member disposed on the bottom surface of the base for fixing the at least one light-emitting element;
a first supporting member, disposed adjacent to the at least one fixing member to support and elevate the at least one light-emitting element, wherein a height of the at least one fixing member is greater than that of the first supporting member; and
a second supporting member, disposed on the bottom surface to support and elevate the wireless charging module to make the top surface having a height measured from the bottom surface equal to the top surface height.

14. The display apparatus according to claim 12, wherein the at least one light-emitting element comprises a plurality of arcuate light guide strips having different radii and radially arranged outside an outer edge of the wireless charging module; and at least one of the plural arcuate light guide strips surrounds the wireless charging module.

15. The display apparatus according to claim 12, wherein the upper cover is made of a one-way light transmissive plate; and the lower surface of the upper cover has a transmittance substantially greater than that of the upper surface.

16. The display apparatus according to claim 12, wherein the at least one light-emitting element comprises:
a light guide strip;
a point-light source, disposed at one end of the light guide strip; and
a light-blocking member, disposed at the other end of the light guide strip.

17. The display apparatus according to claim 12, further comprising at least one circuit board disposed on the bottom surface of the base, and electrically connected to the wireless charging module or the at least one light-emitting element, wherein the at least one circuit board does not overlap with at least one of the wireless charging module and the at least one light-emitting element.

18. The display apparatus according to claim 12, further comprising at least one second fixing member disposed on the lower surface of the upper cover for fixing the at least one light-emitting element onto the lower surface.

19. The display apparatus according to claim 12, wherein the upper cover is made of a black or dark colored light transmissive material; when the at least one light-emitting element is turn on, the light coming from the at least one light-emitting element passes through the black or dark colored light transmissive material to form the indication mark on the upper surface; when the at least one light-emitting element does not emit light, neither the indication mark, nor a profile of the wireless charging module and the at least one light-emitting element can be seen from the upper surface.

20. A display apparatus, comprising:
a display screen; and
a light-emitting wireless charging structure, comprising:
a base;
a wireless charging module, disposed on the base;
at least one light-emitting element, disposed on the base and adjacent to the wireless charging module; and
an upper cover, covering on the wireless charging module and the at least one light-emitting element, wherein the upper cover is made of a one-way light transmissive plate, and has a lower surface facing the wireless charging module and an upper surface opposite to the lower surface;
when the at least one light-emitting element emitting light, the light coming from the at least one light-emitting element passes through the upper cover and forms a mark on the upper surface to indicate a position of the wireless charging module; when the at least one light-emitting element is turn off or kept in an off state, either the mark that has been formed on the upper surface disappears therefrom, or no any mark is ever shown on the top surface.

21. A display apparatus, comprising:
a display screen; and
a light-emitting wireless charging structure, comprising:
a base;
a wireless charging module, disposed on the base;
at least one light-emitting element, disposed on the base and adjacent to the wireless charging module;
an upper cover, covering on the wireless charging module and the at least one light-emitting element, wherein the upper cover has a lower surface facing the wireless charging module and an upper surface opposite to the lower surface; and at least one circuit board, disposed on a bottom surface of the base, and electrically connected to the wireless charging module or the at least one light-emitting element, wherein the at least one circuit board does not overlap with at least one of the wireless charging module and the at least one light-emitting element;

when the at least one light-emitting element emitting light, the light coming from the at least one light-emitting element passes through the upper cover and forms a mark on the upper surface to indicate a position of the wireless charging module; when the at least one light-emitting element is turn off or kept in an off state, either the mark that has been formed on the upper surface disappears therefrom, or no any mark is ever shown on the top surface.

22. A display apparatus, comprising:

a display screen; and a light-emitting wireless charging structure, comprising:

a base;

a wireless charging module, disposed on the base;

at least one light-emitting element, disposed on the base and adjacent to the wireless charging module, wherein the at least one light-emitting element comprises a plurality of arcuate light guide strips having different radii and radially arranged outside an outer edge of the wireless charging module; and at least one of the plural arcuate light guide strips surrounds the wireless charging module; and an upper cover, covering on the wireless charging module and the at least one light-emitting element, wherein the upper cover has a lower surface facing the wireless charging module and an upper surface opposite to the lower surface;

when the at least one light-emitting element emitting light, the light coming from the at least one light-emitting element passes through the upper cover and forms a mark on the upper surface to indicate a position of the wireless charging module; when the at least one light-emitting element is turn off or kept in an off state, either the mark that has been formed on the upper surface disappears therefrom, or no arty mark is ever shown on the top surface.

* * * * *